9219X
F. A. Fairchild.
Tailor's Measure.
Patented Oct. 31, 1835.
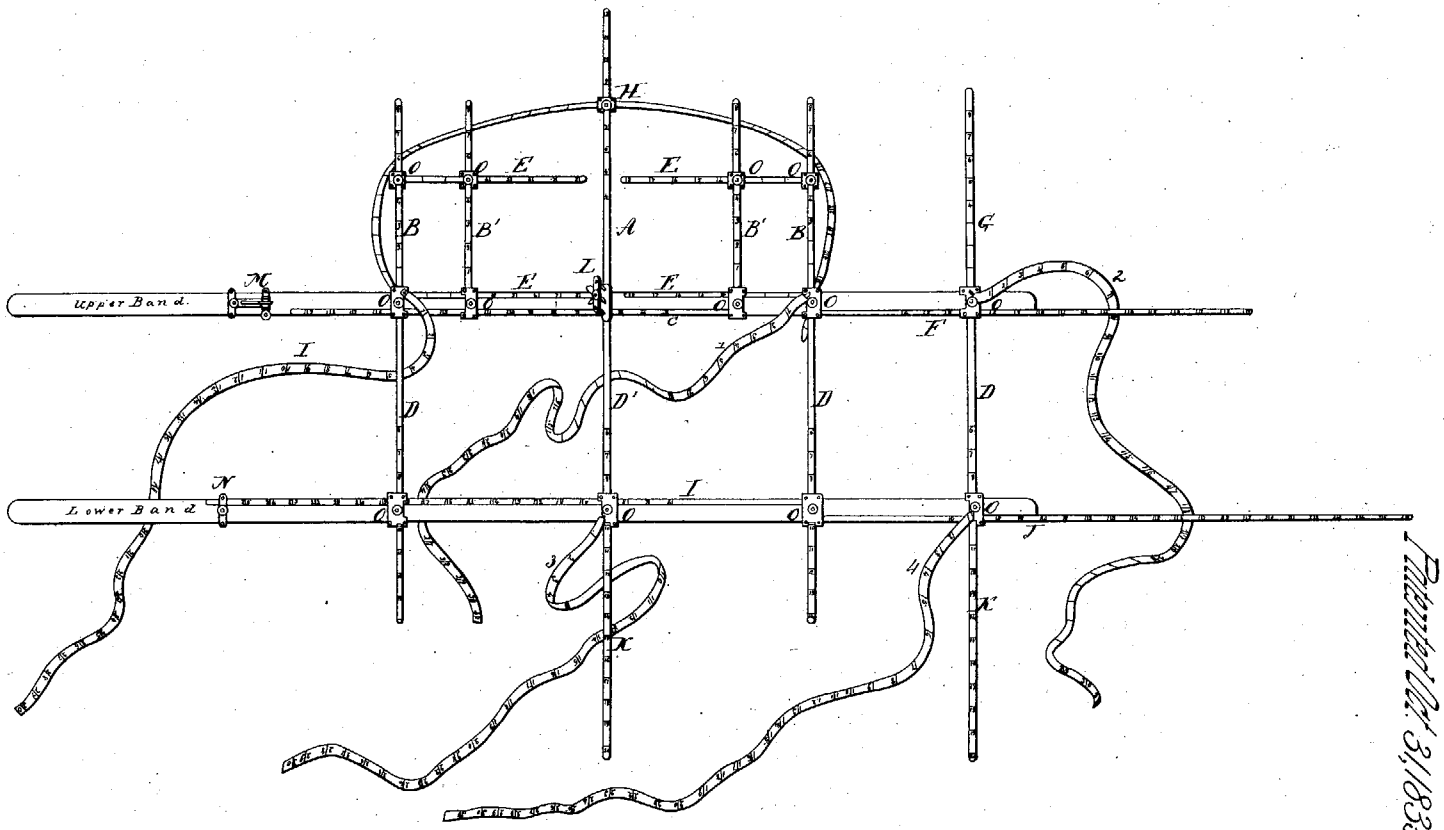

Oct. 31. 1835 9219X 37.

Frederick A. Fairchild, Columbus Georgia

Letters Patent.

The Schedule referred to in these Letters Patent, and making part of the same, and containing a description in the words of the said Frederick A. Fairchild himself of his improvement in the Tailors Measurer, for laying out garments preparatory to cutting.

Be it known that I Frederick A. Fairchild, of Columbus in the County of Muscogee and State of Georgia have made an improvement in the useful Arts being an apparatus for measuring the human body for coats, over coats, vests and other garments called Fairchilds Measurer, for Tailors use, which is described as follows.
First, In the cutting of a coat due consideration must be had of the muscular changes produced in the form of the body by the enlargement or contraction and diminuction, or relaxation of the muscles in their different respective positions in the actions of the body.
The apparatus used consists of two steel elastic bands of about an inch in width and as thin as may be, one of these is intended to be passed around the chest and the other around the waist. There are clasps attached to these, in which clasps are small loops, through which strips of sheet brass are passed and by means of small thumb screws or otherwise said clasps and strips of brass, are fixed in any convenient position in respect to each other. Let it then be immagined that the steel straps for the chest and the waist having on each four clasps adjusted opposite to each other. Through each of the loops in these clasps is passed a strip of sheet brass three eighths of an inch wide and about two feet long being graduated in inches and parts of an inch each steel spring or band being about forty inches long a strip of steel or brass of the width above mentioned is adjusted to each steel band, being of the same length so that by means of these the girth of the persons chest and waist can be ascertained and the steel bands being placed at the greatest breadth breadth of the chest and smallest place of the waist respectively the
sheet brass strips being adjusted four of them to these steel bands thus
placed, two rising at the sides above the shoulders and one rising
behind as high as the back of the head & one in front as high as the
throat, it is obvious that these sheet brass strips may be adjusted through
the loops in the clasps so as to indicate the whole length of the lines
they describe and any parts of them; the measurer noticing the distances
on these sheet brass strips of the several points in the body to be
observed in the cutting of a coat &c. — The precise space for the
arm is ascertained by means of a short piece of sheet brass strip
rising up in front of each arm from the steel band band around
the chest, which short pieces are connected by cross pieces over the
shoulder, these pieces being secured to the steel band and to each
other by clasps, loops and thumb-pieces, besides these pieces there is another which rises
up from the sides of the steel band, around the chest and passes
in front of the shoulders over them and along the back of the
neck in the direction of the coat collar being attached to the
upright back strip by a clasp, loop and thumb screw. Besides
these measures some tape measures may be attached to points
of these strips and thus accurate and complete measurement
may be obtained of all the requisite parts points and spaces
of the body necessary to be ascertained in order to cut a coat, vest
&c. fittingly. The steel bands being held together by clasps & loops
and thumb screws therein as shown by the machine from which this de-
scription was taken deposited in the patent Office. These bands may
in effect be opened and the subject or body enveloped in this
measurer with readiness, and the operation of adjusting these bands
and the strips aforesaid may be performed with dispatch by a
ready operator. The Machine is to be applied to the person
without a coat when the measure is to be taken for a strait body
coat and with a coat on when the measure is to be taken for
an over coat. For a further illustration of my invention I
refer to the model and drawings of the same deposited in the
Patent Patent Office. The principle of this improvement which I claim as my invention, and which I desire to secure by Letters Patent, consists in the combination of the steel bands aforesaid with the sheet brass straps aforesaid by means of the clasps, loops and thumb screws adjustable together as aforesaid substantially as above is described.

In witness whereof I have hereunto subscribed my name before two witnesses this 22<sup></sup>d day of October AD 1835

Witnesses

Clement T. Coote

Wm. P. Elliot

F. A. Fairchild

[950 words]

(Drawing)

Ex[illegible]

W.[illegible]